(12) United States Patent
Dersch et al.

(10) Patent No.: US 6,696,518 B1
(45) Date of Patent: *Feb. 24, 2004

(54) METHOD OF SELECTIVELY HYDROGENATING ETHYLENICALLY UNSATURATED DOUBLE BONDS IN POLYMERS

(75) Inventors: Rolf Dersch, Neustadt (DE); Heiko Maas, Schifferstadt (DE); Volker Schädler, Mannheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/926,625

(22) PCT Filed: May 26, 2000

(86) PCT No.: PCT/EP00/04832

§ 371 (c)(1),
(2), (4) Date: Nov. 27, 2001

(87) PCT Pub. No.: WO00/73357

PCT Pub. Date: Dec. 7, 2000

(30) Foreign Application Priority Data

May 27, 1999 (DE) .......................................... 199 24 340

(51) Int. Cl.[7] .......................... C08L 33/10; C08L 33/12
(52) U.S. Cl. ...................... 524/560; 524/449; 524/451; 524/492; 524/493; 524/494; 524/556; 524/565; 524/566; 524/571; 524/573; 524/575; 524/821; 524/836; 524/561; 524/562; 525/329.3; 525/331.9; 526/91; 526/93; 528/487; 528/488; 528/499
(58) Field of Search ................................ 524/571, 575, 524/565, 821, 836, 556, 561, 562, 449, 451, 492, 493, 494, 566, 560, 573; 525/329.3, 331.9; 526/91, 93; 528/487, 488, 499

(56) References Cited

U.S. PATENT DOCUMENTS

| | | | |
|---|---|---|---|
| 2,485,287 A | * 10/1949 | Henson et al. .............. 523/313 |
| 3,700,637 A | * 10/1972 | Finch, Jr. ................. 525/329.3 |
| 3,898,208 A | * 8/1975 | Krause ........................ 524/575 |
| 4,185,001 A | * 1/1980 | Machurat et al. ............ 523/334 |
| 4,469,849 A | * 9/1984 | Murrer et al. ............... 525/339 |
| 4,517,390 A | * 5/1985 | Russell et al. .............. 568/881 |
| 4,673,757 A | 6/1987 | Fiedler et al. |
| 5,208,296 A | 5/1993 | Rempel et al. |
| 5,241,013 A | 8/1993 | Rempel et al. |
| 5,272,202 A | * 12/1993 | Kubo et al. ................. 524/565 |
| 5,651,995 A | * 7/1997 | Oyama et al. .............. 524/565 |
| 6,403,727 B1 | * 6/2002 | Leube et al. ................ 525/338 |

FOREIGN PATENT DOCUMENTS

| | | | |
|---|---|---|---|
| DE | 197 53 302 | 6/1999 | |
| EP | 0 588 098 | 3/1994 | |
| RU | 2007430 C1 | * 2/1994 | .......... C09D/1/04 |
| RU | 2041900 C1 | * 8/1995 | .......... C04B/41/49 |
| WO | WO 98/07715 | 2/1998 | |
| WO | WO 99/28357 | 6/1999 | |

OTHER PUBLICATIONS

N. T. McManus, et al., J. Macromol. Sci., Rev. Macromol. Chem. Phys., vol. C35, No. 2, pp. 239–285, "Chemical Modification of Polymers: Catalytic Hydrogenation and Related Reactions", 1995.

N. K. Singha, et al., Rubber Chemistry and Technol., vol. 68, pp. 281–286, "A New Method to Hydrogenate Nitrile Rubber in the Latex Form", 1995.

* cited by examiner

*Primary Examiner*—Judy M. Reddick
(74) *Attorney, Agent, or Firm*—Oblon, Spivak, McClelland, Maier & Neustadt, P.C.

(57) ABSTRACT

The present invention relates to a process for hydrogenating ethylenically unsaturated double bonds in polymers P by reacting an aqueous dispersion of at least one polymer P with hydrogen in the presence of at least one hydrogenation catalyst comprising at least one transition metal selected from rhodium and/or ruthenium and at least one nonionic phosphorus compound capable of forming a coordinative compound with the transition metal, which comprises incorporating the hydrogenation catalyst into the aqueous dispersion of the polymer P without adding a solvent. The present invention also relates to the aqueous dispersions of the hydrogenated polymers P obtainable by this process and to coating compositions comprising such dispersions.

15 Claims, No Drawings

METHOD OF SELECTIVELY HYDROGENATING ETHYLENICALLY UNSATURATED DOUBLE BONDS IN POLYMERS

The present invention relates to a process for hydrogenating ethylenically unsaturated double bonds in polymers P by reacting an aqueous dispersion of at least one polymer P with hydrogen in the presence of at least one hydrogenation catalyst.

The hydrogenation of ethylenically unsaturated double bonds is an important method of derivatizing polymers containing such bonds. A range of polymers of this kind are produced on the industrial scale, examples being butadiene- and/or isoprene-based polymers. Therefore, hydrogenation makes it possible to provide classes of polymer which are new or which can otherwise be prepared only by a very much more complex method.

In developing hydrogenation processes for polymers a consideration is that the polymers for hydrogenation may contain not only the ethylenically unsaturated double bonds but also other hydrogenation-reactive functionalities. A feature of the hydrogenation process must therefore be, in general, a high level of selectivity toward the target double bonds. Further, an intrinsic risk of hydrogenation is that there may be generated on the polymer reactive intermediates which have the capacity to react with remaining double bonds and so cause crosslinking.

Techniques for hydrogenating polymers that contain ethylenically unsaturated double bonds are fundamentally known. An overview of such techniques is given by N. T. McManus et al. (J. Macromol. Sci., Rev. Macromol. Chem. Phys. (C 35(2), 1995, 239–285). A common feature of all of the techniques described is that the reaction is conducted in an organic medium. This includes the homogeneous reaction of the dissolved polymer in the presence of a homogeneously dissolved catalyst in an organic solvent, and heterogeneous reactions of polymers in suspension in an organic solvent in the presence of homogeneously dissolved catalysts, and also the hydrogenation of polymer solutions and/or polymer melts in the presence of heterogeneous catalysts. However, gelling is generally observed in the course of the hydrogenation, which points to crosslinking reactions.

EP-A 588097 discloses the hydrogenation of polymers based on butadiene/acrylonitrile (NBR). In these processes the polymers are reacted in the form of aqueous dispersions in at least five times the amount, based on the dispersion, of an organic solvent and in the presence of ruthenium catalysts. Special additives are added to extensively suppress the formation of crosslinked polymers. A disadvantage of this process is the large quantities of solvent that are employed.

Fundamentally there is great interest in the transfer of the catalytic hydrogenation of polymers containing ethylenically unsaturated double bonds to aqueous reaction systems. For instance, some industrially important butadiene polymers are available commercially as aqueous polymer dispersions. Furthermore, the use of solvents in the course of production is a not insignificant cost factor. Solvent avoidance also appears desirable on the grounds of workplace safety and environmental protection.

Singha et al. (Rubber Chemistry and Technology, Vol. 68, 1995 pp. 281–86) describe the hydrogenation of an aqueous NBR dispersion in the presence of water-soluble catalysts of the Wilkinson type. Despite comparatively high catalyst quantities, the conversions achieved are low.

The older German Patent Application P 197 53 302.7 describes the hydrogenation of aqueous polymer dispersions containing butadiene in the presence of a transition metal catalyst comprising rhodium and/or ruthenium and at least one phosphorus compound. In this case a solution of the hydrogenation catalyst is prepared first of all, from a salt or complex compound of the respective transition metal and a phosphorus compound in an organic solvent, under a hydrogen atmosphere, and this solution is subsequently added to the aqueous polymer dispersion to be hydrogenated. This method leads to satisfactory hydrogenation conversions and avoids the use of relatively large amounts of solvent. A disadvantage, however, is that with the catalyst an organic solvent is incorporated into the polymer dispersion. Furthermore, the separate preparation of the catalyst entails additional effort.

It is an object of the present invention to provide a process for hydrogenating ethylenically unsaturated double bonds in polymers which can be conducted in an aqueous dispersion of the polymers P and ensures high selectivity of the hydrogenation of the ethylenic double bond over the hydrogenation of other functionalities and over crosslinking reactions.

We have found that this object is achieved, surprisingly, by a process in which an aqueous dispersion of a polymer P having ethylenically unsaturated double bonds is hydrogenated in the presence of a hydrogenating catalyst which comprises at least one transition metal selected from rhodium and/or ruthenium and at least one nonionic phosphorus compound capable of forming a coordinative compound with the transition metal and is incorporated in the aqueous dispersion of the polymer P without addition of a solvent.

The present invention therefore provides a process for hydrogenating ethylenically unsaturated double bonds in polymers P by reacting an aqueous dispersion of at least one polymer P with hydrogen in the presence of at least one hydrogenation catalyst comprising at least one transition metal selected from rhodium and/or ruthenium and at least one nonionic phosphorus compound capable of forming a coordinative compound with the transition metal, which comprises incorporating the hydrogenation catalyst into the aqueous dispersion of the polymer P without adding a solvent.

In the present case an ethylenically unsaturated double bond is a singly, doubly or triply substituted C=C double bond which is not part of an aromatic π-electron system. It is preferably not conjugated with other double bonds.

In accordance with the invention, the hydrogenation catalyst is incorporated into the dispersion of the polymer P to be hydrogenated without addition of an organic solvent. For this purpose the hydrogenation catalyst can be incorporated as it is, i.e., in the form of a complex compound containing the respective transition metal and at least one phosphorus compound as ligand, into the dispersion. In this case the catalyst is generally incorporated by adding the complex compound comprising transition metal and phosphorus compound to the aqueous dispersion of the polymer P to be hydrogenated. The complex compound comprising transition metal and phosphorus compound can be added as a solid, as an aqueous solution, or as a solution in a dilute aqueous mineral acid, e.g., in dilute hydrochloric acid.

The transition metal and the phosphorus compound can also be incorporated separately into the dispersion of the polymer P to be hydrogenated. For this purpose, the transition metal is incorporated in the form of a salt or complex compound containing no phosphorus compound into the dispersion of the polymer P. In this case the phosphorus compound is incorporated separately into the dispersion of the polymer P.

For incorporating the transition metal into the dispersion of the polymer P it is possible, for example, to add a salt or an appropriate complex compound of the transition metal as a solid, aqueous solution or solution in a dilute mineral acid to the dispersion of the polymer P. The transition metal can also be incorporated by dissolving a salt or complex compound of the transition metal in the monomers M to be polymerized, prior to the preparation of the dispersion of the polymer P, and subsequently preparing the polymer P by polymerizing the monomers M in the presence of the transition metal. This method is particularly appropriate when the aqueous dispersion of the polymer P is prepared by free-radical aqueous emulsion polymerization of the monomers M constituting the polymer P. Where the aqueous dispersion of the polymer P is a secondary dispersion, the transition metal can be dissolved in appropriate form in a solution or melt of the polymer, which is then converted to the actual aqueous dispersion of the polymer P. The phosphorus compound can in principle be added at any of the abovementioned points in time. Preferably, the phosphorus compound is added to the aqueous dispersion of the polymer P. In particular, it is added shortly before hydrogenation to the aqueous dispersion of the polymer P.

Ruthenium and rhodium complex compounds and salts, as yet without phosphorus compounds as ligands, which are suitable in accordance with the invention are listed by way of example below: the salts of ruthenium and of rhodium include their hydrides, oxides, sulfides, nitrates, sulfates, halides, such as their chlorides, carboxylates, such as their acetates, propionates, hexanoates and benzoates, their salts with sulfonic acids, and mixed salts, i.e. salts with different anions, such as the oxide chlorides. Also suitable are salts of complex ions of rhodium and/or ruthenium, examples being the salts of rhodium or ruthenium oxoacids, the salts of haloruthenates and halorhodates, especially the chlororuthenates and chlororhodates, the ammine and aquo complexes of rhodium halides and of ruthenium halides, especially the chlorides, and the salts of nitroruthenates. Examples of the above salts and complex salts are: ruthenium(III) chloride, ruthenium(III) nitrosylchloride, ammonium pentachloroaquoruthenate(III), hexammineruthenium(II) and -(III) chloride, dichlorobis(2,2'-dipyridyl)ruthenium(II), tris(2,2'-dipyridyl)ruthenium(II) chloride, pentamminechlororuthenium(III) chloride, potassium pentachloronitrosylruthenium(II), ruthenium(IV) oxide, tetraacetatochlorodiruthenium(II,III), hexakisacetatotriaquo-μ-oxotriruthenium(III) acetate, rhodium(III) chloride, rhodium(III) hydroxide, rhodium(III) nitrate, rhodium(III) sulfate, ammonium pentachloroaquorhodate(III), potassium pentachlororhodate (III), sodium hexachlororhodate(III), triamminetrichlororhodium(III), trisethylenediaminerhodium(III) chloride, rhodium(II) acetate dimer, hexakisacetatotriaquo-μ-oxotrisrhodium(III), rhodium(IV) oxide and potassium hexanitrorhodate(III). Neutral complexes of rhodium and of ruthenium are likewise suitable. It should be noted here that the transitions between salts of ruthenium or rhodium and the saltlike and neutral complexes are imprecise, and the subdivision made here is merely an aid to organization. Examples of neutral complexes containing no phosphorus compound are the 2,4-pentanedionates of rhodium and ruthenium, such as ruthenium(III) tris-2,4-pentanedionate, rhodium(I) dicarbonyl-2,4-pentanedionate, rhodium(III) tris-2,4-pentanedionate, bisethylenerhodium(I) 2,4-pentanedionate and norbornadienerhodium(I) 2,4-pentanedionate, and the carbonyl complexes of ruthenium and rhodium, such as dodecacarbonyltetrarhodium, hexadecacarbonylrhodium, tetracarbonyldi-μ-chlorodirhodium(I) and dodecacarbonyltriruthenium.

Suitable in accordance with the invention are organophosphorus compounds in which the phosphorus atoms are trivalent. These compounds contain preferably one or two phosphorus atoms.

Examples of preferred phosphorus compounds are the compounds of the formula I

   (I)

and the compounds of the formula II

   (II)

where

R radicals can be identical or different and independently of one another are $C_1$–$C_{10}$-alkyl, $C_4$–$C_{12}$-cycloalkyl, aryl, $C_1$–$C_{10}$-alkyloxy, $C_4$–$C_{12}$-cycloalkyloxy and aryloxy or fluoro, or two radicals R together are $C_3$–$C_6$-alkylene, $C_3$–$C_6$-alkenylene or $C_3$–$C_6$-alkadienylene, A is a bivalent hydrocarbon radical, and x,y independently of one another are 0 or 1, preferably 0.

$C_1$–$C_{10}$-Alkyl here is either linear or branched alkyl having 1 to 10, preferably 1 to 6 and, in particular, 1 to 4 carbon atoms, e.g., methyl, ethyl, n-propyl, isopropyl, n-butyl, 2-butyl, isobutyl, tert-butyl, n-hexyl, 2-ethylhexyl and n-decyl. $C_1$–$C_{10}$-Alkyloxy is a linear or branched, primary, secondary or tertiary alkoxy group having 1 to 10, preferably 1 to 6 and, in particular, 1 to 4 carbon atoms, e.g., methoxy, ethoxy, n-propoxy, isopropoxy, n-butoxy, 2-butyloxy, tert-butoxy, n-hexyloxy and 2-ethylhexyloxy. The alkyl groups in $C_1$–$C_{10}$-alkyl and $C_1$–$C_{10}$-alkoxy can be fully or partly halogenated and/or can have one, two or three functional groups selected from hydroxyl and amino functions or can be interrupted by one or more nonadjacent oxygen atoms or imino groups. Examples of radicals of this kind are 2-hydroxyethyl, hydroxypropyl, 2-aminoethyl and 5-hydroxy-3-oxopentyl. Partly halogenated here and below means that the respective group has one, two, three, four or five halogen atoms, preferably chlorine or fluorine.

$C_4$–$C_{12}$-Cycloalkyl is a saturated mono-, bi- or tricyclic radical such as cyclobutyl, cyclopentyl, cycloheptyl, cyclooctyl, norbornyl, camphyl or tricyclodecanyl, which can have up to 12 carbon atoms and can be fully or partly halogenated and/or can have one, two or three substituents or functional groups selected from $C_1$–$C_4$-alkyl, $C_1$–$C_4$-alkoxy, hydroxyl functions and amino functions. Within the ring system they may further have one or more nonadjacent oxygen atoms or imino groups.

Where two radicals R together are $C_3$–$C_6$-alkylene, $C_3$–$C_6$-alkenylene or $C_3$–$C_6$-alkadienylene, they are a linear hydrocarbon chain containing 3, 4, 5 or 6 carbon atoms in the chain, which can be interrupted by one or two oxygen atoms. Together with the phosphorus atom to which they are attached they therefore form a phosphorus heterocycle which in addition to the phosphorus atom may contain one or two oxygen atoms and contains at least 4 and up to 9 ring atoms. $C_3$–$C_6$-Alkylene, $C_3$–$C_6$-alkenylene or $C_3$–$C_6$-alkadienylene can have one, two or three substituents or functional groups selected from $C_1$–$C_4$-alkyl, $C_1$–$C_4$-alkoxy, hydroxyl functions and amino functions. Together with one or two phenyl groups they may also form a condensed polycyclic system. For example, two radicals R may form a tetrahydrophosphol-1-yl, benzodihydrophosphol-1-yl, dibenzophosphol-1-yl or phenoxaphosphan-10-yl radical.

Aryl is phenyl, naphthyl or anthracenyl which can be fully or partly halogenated and/or can have one or more substituents selected from $C_1$–$C_4$-alkyl, $C_1$–$C_4$-alkyloxy, amino, di-$C_1$–$C_4$-alkylamino and hydroxyl, which if desired may also be ethoxylated. Preferred aryl is phenyl, o-, m- or p-tolyl, p-chlorophenyl, p-tert-butylphenyl and p-hydroxyphenyl, which can also be ethoxylated (degree of ethoxylation from 1 to 50).

A is a saturated or unsaturated, monocyclic, polycyclic or acyclic, divalent hydrocarbon radical having preferably up to 25 carbon atoms.

A is, for example, linear or branched $C_2$–$C_{12}$-, preferably $C_2$–$C_6$-alkylene such as 1,2-ethylene, 1,2- and 1,3-propylene, 2,3-butylene, 2,2-dimethyl-1,3-propylene, butane-1,4-diyl, which is optionally substituted and/or may be part of a carbocyclic or heterocyclic ring system, as for example in 2,3-(1',3'-dioxa-2',2'-dimethylpropane-1',3'-diyl) butane-1,4-diyl and trans- or cis-norbornane-1,2-diyl. A is also divalent mono-, bi- or tricyclic radicals having phenyl, naphthyl or anthracenyl groups and comprises in particular o-phenylene, o,o-diphenylene, (o,o-diphenylene)methane, 2,2-(o,o-diphenylene)propane, o,o-diphenylene ether, 1,8-naphthylene, 2,2'-binaphthylene, 1,1'-ferrocenylene, 1,9-anthracenylene, 1,9-xanthenylene, it being possible for the phenylene, naphthylene or anthracenylene groups to be fully or partly halogenated and/or to have one or more substituents selected from $C_1$–$C_4$-alkyl, $C_1$–$C_4$-alkyloxy, amino, di-$C_1$–$C_4$-alkylamino and hydroxyl, which if desired may also be ethoxylated.

Preferred radicals R are methyl, ethyl, n-propyl, isopropyl, n-butyl, 2-butyl, isobutyl, tert-butyl, n-hexyl, cyclohexyl, cyclopentyl, phenyl, o-, m- or p-tolyl, p-chlorophenyl, p-tert-butylphenyl and p-hydroxyphenyl, especially n-butyl, 2-butyl, isobutyl, tert-butyl, cyclohexyl and phenyl.

Examples of preferred compounds of the formula I are triphenylphosphine, triisopropylphosphine, tri-n-butylphosphine, ri-n-octylphosphine, tricyclopentylphosphine, tricyclohexylphosphine, trisanisylphosphine, tris(p-tolyl)phosphine, triethyl phosphite, tri-n-butyl phosphite and dibenzophosphole. Examples of preferred compounds of the formula II are 1,2-bis(diphenylphosphino)ethane, 1,3-bis(diphenylphosphino)propane, 1,1'-bis(diphenylphosphino) ferrocene, 2,2'-bis(diphenylphosphino)-1,1'-biphenyl and 2,2'-bis(diphenylphosphino)-1,1'-binaphthyl. Further examples of compounds of the formula II can be found in WO 97/33854, Angew. Chem. 1999, 111 p. 349; Applied Homogeneous Catalysis with Organometallic Compounds, Vol. 1 (eds., B. Cornils, W. A. Herrmann) VCH Weinheim, New-York 1996.

The phosphorus compounds of the invention can also be modified by having further atoms or groups of atoms suitable for coordination with the metal atom, such as amino or imino groups, e.g., oxazoline or imidazoline groups. The mode of action of phosphorus compounds of this kind can probably be explained by hypothesizing that they assist the formation of hydrogenation-active species from the particular ruthenium or rhodium precursor that is used. Preferred phosphorus compounds are the abovementioned compounds of the formulae I and II.

Complexes of ruthenium with at least one phosphorus compound, in accordance with the invention, are preferably of the formula III:

$$RuX^1X^2(CO)_k(L^1)_l(L^2)_2 \qquad (III)$$

where

X¹ and X² independently are hydrogen, halogen, preferably chloride, the anion of a carboxylic acid, such as acetate, benzoate or hexanoate, or of a sulfonic acid, such as phenylsulfonate, acetylacetonate or substituted or unsubstituted phenyl, k and l independently are 0, 1 or 2 with the proviso that k+l=1 or 2, $L^1$ is selected from carbonyl, pyridine, benzonitrile, dibenzophosphole, cycloolefins and a ligand of the formula $PR_3$, in which R is as defined above, and $L^2$ may be a phosphorus-containing ligand of the formula I and $(L^2)_2$ may be a phosphorus-containing ligand of the formula II.

Complexes of rhodium with at least one phosphorus compound, in accordance with the invention, are preferably of the formula IV:

$$RhX_mL^3L^4(L^5)_n \qquad (IV)$$

where

X is halide, preferably chloride or bromide, the anion of a carboxylic acid, acetylacetonate, aryl- or alkylsulfonate, hydride or the diphenyltriazine anion, $L^3$, $L^4$ and $L^5$ independently are CO, olefins, cycloolefins, benzonitrile or a phosphorus-containing ligand of the formula I or II, m is 1 or 2 and n is 0, 1 or 2, with the proviso that at least one of the ligands $L^3$, $L^4$ and $L^5$ is one of the abovementioned phosphorus-containing ligands of the formula I or II.

X in formula III or IV is preferably hydride, chloride, bromide, acetate, tosylate, acetylacetonate or the diphenyltriazine anion, especially hydride, chloride or acetate.

Examples of suitable phosphine complexes of formulae III and IV are: carbonylchlorohydridobis (tricyclohexylphosphine)ruthenium(II), carbonylchlorohydridobis(triisopropylphosphine)ruthenium (II), carbonylchlorohydridobis(triphenylphosphine) ruthenium(II), carbonylchlorostyrylbis (tricyclohexylphosphine)ruthenium(II), carbonylchlorostyrylbis(triisopropylphosphine)ruthenium (II), carbonylchlorobenzoatobis(triphenylphosphine) ruthenium(II), dichlorotris(triphenylphosphine)ruthenium (II), bis(triphenylphosphine)rutheniumdicarbonyl chloride, acetatohydridotris(triphenylphosphine)ruthenium(II), chlorotris(triphenylphosphine)rhodium(I), hydridotetrakis (triphenylphosphine)rhodium(I), hydridotris (dibenzophosphole)rhodium(I).

The preferred transition metal in the process of the invention is ruthenium. It is employed preferably as one of the abovementioned ruthenium compounds having 2,4-pentanedionate ligands especially ruthenium tris-2,4-pentanedionate. Ruthenium is used preferably with compounds of the formula I in particular with triisopropylphosphine, tri-n-butylphosphine, tris-n-octylphosphine, tricyclohexylphosphine, triphenylphosphine, trisanisylphosphine and tris(p-tolyl) phosphine.

Depending on the nature of the catalyst system and on the desired conversion, amounts of catalyst in the range from 1 to 1000 ppm, preferably from 5 to 500 ppm of ruthenium and/or rhodium, based on the overall weight of the polymer P to be hydrogenated, are used. The molar ratio of phosphorus compound to metal atom is generally within the range from 1:10 to 100:1, preferably from 1:2 to 50:1 and especially from 1:1 to 20:1.

The hydrogenation of the invention is generally carried out such that first of all the hydrogenation catalyst is incorporated in the manner described above into the aqueous dispersion of the polymer P. If desired, the dispersion is adjusted to an appropriate solids content by dilution with water or with a water/emulsifier mixture prior to or subsequent to incorporating the catalyst. The solids content of the dispersion of polymer P that is to be hydrogenated is generally within the range from 20 to 60% by weight and preferably within the range from 20 to 50% by weight.

The catalyst-containing dispersion is then transferred, if appropriate, into a reaction vessel suitable for hydrogenation, any oxygen is removed by, for example, flushing the reaction vessel with an inert gas such as nitrogen, the desired hydrogen pressure is established, and the components are heated to a suitable reaction temperature. In this case it is possible, for example, to adopt a procedure in which first of all, following the addition of the catalyst to the dispersion, a relatively low hydrogen overpressure is established, then the reaction mixture is heated to the desired reaction temperature, and then the hydrogen overpressure required for the reaction is established.

The hydrogenation is generally conducted under a hydrogen partial pressure in the range from 0.5 to 600 bar, preferably from 50 to 400 bar, in particular from 100 to 300 bar. The reaction temperature is generally within the range from 20 to 250° C., preferably from 50 to 200° C., in particular from 100 to 180° C. The duration of the reaction is generally within the range from 1 to 50 hours, preferably from 2 to 40 hours and, in particular, from 3 to 30 hours.

Depending on the desired quality of the hydrogenated polymer, the reaction can be conducted up to a defined conversion, which is controlled in a known manner by means of reaction parameters such as the hydrogen pressure and temperature and by the amount of catalyst system used. The reaction is preferably conducted up to a conversion of at least 50%, based on the ethylenic double bonds present in P. The choice of respective reaction parameters can be determined by the skilled worker in routine experiments. A determination of the degree of conversion can be carried out, for example, by IR spectrometry, by checking the bands typical of ethylenically unsaturated double bonds in the region from 900 to 1000 cm$^{-1}$.

A feature of the above process of the invention is that the ethylenic double bonds of the polymers P are hydrogenated selectively even in the presence of other hydrogenation-active double bonds, such as aromatic C=C double bonds, carbonyl groups, nitrile functions, etc., without observing any significant hydrogenation of other double bonds. Furthermore, the process of the invention is simplified in its implementation by virtue of the fact that it is not necessary to prepare the catalyst separately. Moreover, no solvents are needed.

Suitable substrates for the hydrogenation process of the invention are in principle all aqueous dispersions of polymers having ethylenically unsaturated double bonds. These include both dispersions prepared by free-radical polymerization of aqueous monomer emulsions (primary dispersions) and those whose polymers are prepared by another route and are then converted to an aqueous dispersion form (secondary dispersions). The term polymer dispersion also embraces, in principle, dispersions of microcapsules.

The solvent content (organic solvents) of the polymer dispersion to be hydrogenated will generally not exceed 1000 ppm, and in particular 500 ppm, based on the overall weight of the dispersion.

Preferred polymers P are homo- or copolymers of conjugated dienes comprising generally from 10 to 100% by weight, preferably from 20 to 100% by weight, of at least one conjugated diene in copolymerized form (monomers a). Examples of suitable monomers a are butadiene, isoprene, chloroprene, 1-methylbutadiene, 2,3-dimethylbutadiene, and 2-(tri-$C_1$-$C_4$-alkyl)silylbutadiene, such as 2-triethylsilyl-1,3-butadiene. Preferred monomers a are butadiene and isoprene, especially butadiene.

A preferred embodiment of the present invention relates to hydrogenating polymers P which are built up from at least one conjugated diene as monomer a, from at least one further, monoethylenically unsaturated monomer b, which is copolymerizable with the diene and, if desired, a further, modifying monomer c. Copolymers of this kind are generally composed of from 10 to 99% by weight, in particular from 15 to 95% by weight and especially from 20 to 90% by weight of monomer(s) a and from 1 to 90% by weight, preferably from 5 to 85% by eight and especially from 10 to 80% by weight of monomer(s) b. The modifying monomers c make up generally up to 20% by weight, based on the overall weight of the polymer's constituent monomers a, b and c.

Suitable monomers b are the monomers commonly used for the preparation of aqueous polymer dispersions, these monomers normally having a water solubility of less than 80 g/l. Examples include:

olefins such as ethylene, propene, n-butene, and isobutene;

vinylaromatic monomers, such as styrene, α-methylstyrene, o-chlorostyrene or vinyltoluenes;

vinyl and allyl esters of aliphatic, linear or branched $C_1$–$C_{18}$ monocarboxylic acids, such as vinyl acetate, propionate, butyrate, valerate, hexanoate, 2-ethylhexanoate, decanoate, laurate und stearate;

esters of preferably $C_3$–$C_6$ ethylenically unsaturated mono- and dicarboxylic acids, such as esters of acrylic, methacrylic, maleic, fumaric and itaconic acid, with generally $C_1$–$C_{12}$-, preferably $C_1$–$C_8$- and, in particular, $C_1$–$C_4$-alkanols, such as methanol, ethanol, n-propanol, isopropanol, 1-butanol, 2-butanol, isobutanol, tert-butanol, n-hexanol, 2-ethylhexanol, or $C_5$–$C_{10}$-cycloalkanols, such as cyclopentanol or cyclohexanol, and of these particularly preferably the esters of acrylic and/or methacrylic acid, examples being methyl methacrylate, n-butyl methacrylate, tert-butyl methacrylate, methyl acrylate, ethyl acrylate, n-butyl acrylate, tert-butyl acrylate, 2-ethylhexyl acrylate and lauryl acrylate.

Further suitable monomers b are ethylenically unsaturated nitriles such as acrylonitrile or methacrylonitrile.

The modifying monomers c include monomers c', which are of increased solubility in water (for example ≧80 g/l at 25° C. and 1 bar). The monomers c' include, for example, the abovementioned ethylenically unsaturated carboxylic acids, especially acrylic, methacrylic, maleic and itaconic acid, the amides of the abovementioned ethylenically unsaturated carboxylic acids, such as acrylamide and methacrylamide, the N-alkylolamides of the abovementioned ethylenically unsaturated carboxylic acids, such as N-methylolacrylamide and N-methylolmethacrylamide, the hydroxyalkyl esters of the abovementioned ethylenically unsaturated carboxylic acids, such as 2-hydroxyethyl acrylate and methacrylate, ethylenically unsaturated sulfonic acids and their alkali metal salts, such as vinylsulfonic acid, allylsulfonic acid, methallylsulfonic acid, acrylamido-2-methylpropanesulfonic acid, and also N-vinyllactams, such as N-vinylpyrrolidone or N-vinylcaprolactam, for example. Such monomers c' are generally employed in a minority, in other words ≦20% by weight, based on the overall amount of the monomers a, b and c that are to be polymerized, preferably ≦10% by weight and, for example, in amounts of up to 0.1 to 10% by weight and especially 0.5 to 8% by weight.

The monomers c present in the polymers P to be hydrogenated may also include monomers c", which have at least two nonconjugated, ethylenically unsaturated bonds—examples are the diesters of dihydric alcohols with ethylenically unsaturated monocarboxylic acids. Examples of these are alkylene glycol diacrylates and dimethacrylates, such as ethylene glycol di(meth)acrylate, 1,3-butylene glycol di(meth)acrylate, 1,4-butylene glycol di(meth)acrylate, propylene glycol di(meth)acrylate, and also divinylbenzene, vinyl methacrylate, vinyl acrylate, allyl methacrylate, allyl acrylate, diallyl maleate, diallyl fumarate, diallyl phthalate, methylenebisacrylamide, cyclopentadienyl acrylate and methacrylate, tricyclodecenyl acrylate and methacrylate, N,N'-divinylimidazolin-2-one or triallylcyanurate. Such monomers are employed, if desired, in amounts of from 0.01 to 10% by weight, based on the overall amount of the monomers a+b+c.

Furthermore, as monomers c the polymer P may also include in copolymerized form bifunctional monomers which in addition to an ethylenically unsaturated double bond have at least one reactive functional group—for example an epoxide, anhydride, aldehyde or keto carbonyl function. Examples of bifunctional monomers are ethylenically unsaturated glycidyl ethers and glycidyl esters, examples being vinyl, allyl and methallyl glycidyl ether, glycidyl acrylate and glycidyl methacrylate, the anhydrides of $\alpha,\beta$-monoethylenically unsaturated mono- and dicarboxylic acids, e.g., acrylic anhydride and methacrylic anhydride, the diacetonylamides of the abovementioned ethylenically unsaturated carboxylic acids, e.g., diacetone (meth)acrylamide, and the esters of acetylacetic acid with the abovementioned hydroxyalkyl esters of ethylenically unsaturated carboxylic acids, e.g., acetylacetoxyethyl (meth) acrylate. The polymers P to be hydrogenated can contain bifunctional monomers in amounts of up to 20% by weight, for example, from 0.01 to 10% by weight. The functional groups of the bifunctional monomers are not destroyed by the hydrogenation and allow the polymers P of the invention to be subsequently crosslinked with, for example, polyfunctional amines, hydrazides or alcohols.

Preferred embodiments of the process of the invention relate to the hydrogenation of polymer dispersions whose polymers P are composed essentially of butadiene and/or isoprene, especially butadiene as sole monomer a, and of styrene, acrylonitrile, methacrylonitrile, isobutene and/or (meth)acrylic acid alkyl esters as monomers b. Preferred monomers c are acrylic acid, methacrylic acid, itaconic acid, acrylamide, methacrylamide, N-methylolacrylamide and/or N-methylolmethacrylamide.

Preferred monomer combinations a/b are butadiene and/or isoprene with styrene and/or α-methylstyrene; butadiene with acrylonitrile and/or methacrylonitrile; butadiene and isoprene with acrylonitrile and/or methacrylonitrile; butadiene with acrylonitrile and styrene; butadiene with isobutene; and butadiene with (meth)acrylic acid alkyl esters.

The process of the invention is notable firstly in that the ethylenic double bonds of the polymers P are selectively hydrogenated without other hydrogenation-active double bonds being attacked—for example, aromatic C=C double bonds, carbonyl groups, nitrile functions, and epoxide groups. Secondly, there is little or no crosslinking of the polymers. Thirdly, the preparation of the hydrogenation catalyst prior to hydrogenation becomes unnecessary. Fourthly, the process of the invention avoids the unnecessary use of solvents.

The preparation of aqueous dispersions of the polymers P that are suitable for hydrogenation is known to the skilled worker and can in principle be carried out by anionic, free-radical or Ziegler-Natta polymerization in solution, in bulk, in suspension or in emulsion. Depending on the type of reaction, the conjugated dienes are 1,4- and/or 1,2-polymerized. If the polymers P obtainable in accordance with the processes mentioned above are not actually obtained in the form of aqueous dispersions (primary dispersions), they are converted into an aqueous dispersion in a known manner prior to the hydrogenation (and are then known as secondary dispersions).

For the hydrogenation process of the invention it is preferred to employ polymers prepared by free-radical aqueous emulsion polymerization of the above monomers a and, if used, b and/or c (including mini- and microemulsion polymerization). These techniques are sufficiently well known to the skilled worker and are described at length in the literature, for example in Ullmann's Encyclopedia of Industrial Chemistry, 5th ed., Vol. A21., pp. 373–393. In general, such polymers are prepared in the presence of free-radical initiators and, if desired, surface-active substances such as emulsifiers and protective colloids (see, for example Houben-Weyl, Methoden der organischen Chemie, Vol. XIV/1, Makromolekulare Stoffe, Georg Thieme-Verlag, Stuttgart 1961, pp. 192–208).

Suitable free-radical polymerization initiators include organic peroxides, such as tert-butyl hydroperoxide, benzoyl hydroperoxide, diisopropylbenzoyl peroxide, inorganic peroxides, such as hydrogen peroxide, salts of peroxomono- and/or peroxodisulfuric acid, especially the ammonium and/or alkali metal peroxodisulfates (persulfates), and azo compounds, particular preference being given to persulfates. Preference is also given to combined systems composed of at least one organic reducing agent and at least one peroxide and/or hydroperoxide, such as tert-butyl hydroperoxide and the sodium salt of hydroxymethanesulfinic acid, or hydrogen peroxide and ascorbic acid (as an electrolyte-free redox initiator system), and to combined systems which additionally comprise a small amount of a metal compound which is soluble in the polymerization medium and whose metallic component can exist in a plurality of valence states, for example, iron(II) sulfate and water-soluble Fe/V salts. These polymerization initiators are employed in customary amounts, such as in amounts of from 0.01 to 5, preferably from 0.1 to 2.0% by weight, based on the monomers to be polymerized.

The monomer mixture can if desired be polymerized in the presence of customary polymerization regulators, such as mercaptans, an example of which is tert-dodecyl mercaptan. These regulators are then used in an amount of from 0.01 to 5% by weight, based on the overall amount of the mixture.

There are no particular restrictions on the emulsifiers that can be used. Suitable substances are neutral emulsifiers such as ethoxylated mono-, di- and trialkylphenols (EO degree: 3 to 50, alkyl: $C_4$ to $C_9$) or ethoxylated fatty alcohols (EO degree: 3 to 50, alkyl: $C_8$ to $C_{36}$) and anionic emulsifiers, such as alkali metal and ammonium salts of fatty acids (alkyl: $C_{12}$ to $C_{24}$), alkyl sulfates (alkyl: $C_8$ to $C_{22}$), of sulfuric monoesters of ethoxylated alkanols (EO degree: 4 to 30, alkyl: $C_8$ to $C_{22}$) and ethoxylated alkylphenols (EO degree: 3 to 50, alkyl: $C_4$ to $C_{10}$), of alkylsulfonic acids (alkyl: $C_8$ to $C_{22}$) and of alkylarylsulfonic acids (alkyl: $C_4$ to $C_{18}$). Further suitable anionic emulsifiers are alkali metal or ammonium salts of mono- or di-$C_4$–$C_{24}$-alkyl derivatives of bis(phenylsulfonic acid) ether such as technical-grade mixtures comprising from 50 to 80% of the monoalkylated product. Such emulsifiers are known from U.S. Pat. No. 4,269,749; the technical-grade mixtures are obtainable, for example, commercially under the designation Dowfax®2A1 (Dow Chemical).

Particular preference is given to the alkali metal and/or ammonium salts, especially the sodium salts. Additional appropriate emulsifiers are given in Houben-Weyl, Methoden der organischen Chemie, Vol. XIV/1, Makromolekulare Stoffe, Georg-Thieme Verlag, Stuttgart, 1961, pp. 192 to 208.

Instead of or in a mixture with emulsifiers it is also possible, however, to employ conventional protective colloids, such as polyvinyl alcohol, polyvinylpyrrolidone or amphiphilic block polymers with short hydrophobic blocks, for the purpose of co-stabilization. In general the amount of emulsifiers used, based on the monomers to be polymerized, will not exceed 5% by weight.

The polymerization reaction is preferably conducted in the presence of an aqueous polymer dispersion as polymer seed (seed latex). Such techniques are fundamentally known to the skilled worker and are described, for example, in DE-A 42 13 967, DE-A 42 13 968, EP-A 567 811, EP-A 567 812 or EP-A 567 819 which are incorporated fully herein by reference.

The polymerization reaction is preferably carried out under superatmospheric pressure. The period of polymerization can vary within a wide range, and is generally from 1 to 15 hours, preferably from 3 to 10 hours. The temperature of polymerization is also variable within a wide range and, depending on the initiator used, is from about 0 to 110° C.

The polymer dispersions prepared in this way generally have solids contents of up to 75% by weight. Particular importance is attached to polymer dispersions having solids contents of from 40 to 70% by weight. For use in the hydrogenation process of the invention it is possible to employ the dispersions with these solids contents. In some cases, however, the dispersions are diluted with water or an aqueous emulsifier solution to an appropriate solids content beforehand. The solids content of the dispersion employed in the process is preferably in the range from 10 to 60% by weight, in particular from 20 to 50% by weight, based on the overall weight of the dispersion.

The surface-active substances still present, in general, in the polymer dispersions, and further substances used, for example, as customary polymerization auxiliaries in emulsion polymerizations, do not have a disruptive effect on the hydrogenation process of the invention. However, it is advisable to subject the polymer dispersions to chemical or physical deodorization before hydrogenation in order to free them of solvents and unpolymerized monomers.

The dispersions, obtainable by the process of the invention, of the hydrogenated polymers P' derived from the polymers P are novel and are likewise provided by the present invention. The polymers P' they contain, which can be obtained in a known manner from the dispersions, are notable for a high level of stability, improved significantly in comparison with the polymers P of the unhydrogenated base dispersions, to environmental influences such as light, oxygen and/or elevated temperature. For instance, the hydrogenated polymers P' show little tendency toward yellowing or embrittlement. Furthermore, the hydrogenated polymers P' are notable for an improvement, relative to the unhydrogenated polymers P, in tensile strength and elongation at break.

This predestines the dispersions of the hydrogenated polymers P', obtainable by the process of the invention, for use as binders for sealing or coating compositions, such as in emulsion paints, for example, in polymer-modified plasters, especially for exterior applications, as finishes for textiles, leather and paper, as pressure-sensitive adhesives, as an elastomeric component in molding compounds, and for modifying mineral building materials, such as for modifying mortar or cement and/or concrete, for example.

A specific embodiment A1 of the present invention relates to hydrogenated polymer dispersions derived from polymers P composed essentially of:

from 10 to 90% by weight, preferably from 20 to 70% by weight, in particular from 25 to 65% by weight of at least one monomer a selected from butadiene and isoprene, especially butadiene as sole monomer a, from 10 to 90% by weight, preferably from 30 to 80% by weight, in particular from 35 to 75% by weight of at least one monomer b selected from vinylaromatic monomers, esters of acrylic acid with a $C_1$–$C_{12}$-alkanol, esters of methacrylic acid with a $C_1$–$C_{12}$-alkanol, acrylonitrile and methacrylonitrile, especially styrene as sole monomer b, from 0 to 20% by weight, preferably from 0 to 10 and in particular from 0.1 to 8% by weight of one or more monomers c, the fractions of the monomers a, b and c adding up to 100% by weight and the fraction of acrylonitrile and methacrylonitrile being less than 20% by weight.

Of these, particular preference is given to hydrogenated aqueous dispersions of polymers obtainable from dispersions whose polymers P comprise butadiene as monomer a and styrene as monomer b. Preferred monomers c of this embodiment are acrylic acid, methacrylic acid, itaconic acid, acrylamide, methacrylamide, N-methylolacrylamide and/or N-methylolmethacrylamide.

Polymer dispersions containing butadiene and styrene in copolymerized form are prepared preferably by free-radical emulsion polymerization and are important industrial products. They are comparable in many respects to styrene/butyl acrylate-based polymers, the copolymerized butadiene taking over the role of the "softening" butyl acrylate. Although butadiene possesses a considerable cost advantage over butyl acrylate, in that the former can be separated directly from the $C_4$ cut from the steam cracker whereas the latter has to be prepared in at least two steps starting from steam cracker products, butadiene-containing polymers are, on the other hand, hampered by the abovementioned disadvantages in respect of their weathering stability, so that their possible applications have to date been greatly limited.

The hydrogenation process of the invention leads, in the case of the polymers P, for example, in the case of the polymers of the embodiment A1, e.g., in the case of those based on butadiene/styrene, to hydrogenated polymers P' which in terms of their mechanical properties are, surprisingly, at least comparable with, if not superior to, the unhydrogenated polymers and which have a markedly lower sensitivity to environmental conditions. This predestines the dispersions of the hydrogenated polymers P' and especially of the embodiment A1 for use as binders for sealing or coating compositions, e.g., for aqueous coating compositions such as emulsion paints, in polymer-modified plasters, especially for exterior applications, as finishes for textiles, leather and paper, as pressure-sensitive adhesives, as an elastomeric component in molding compounds, and for modifying mineral building materials, such as for modifying mortar, clays, cement or concrete, e.g., liquid concrete.

The hydrogenated dispersions of the polymers P find a specific application as binders in aqueous coating compositions such as emulsion paints. Such compositions generally include a hydrogenated polymer obtainable by this process, especially one of the embodiment A1, and of these preferably one based on styrene and butadiene in the form of its aqueous dispersion, and at least one inorganic pigment and/or an organic or inorganic filler, and customary auxiliaries. Coating compositions of this kind normally contain from 30 to 75% by weight and, preferably, from 40 to 65% by weight of nonvolatile constituents. Nonvolatiles are all those constituents of the formulation other than water, or at least the total amount of binder, filler, pigment, solvents of low volatility (boiling point higher than 220° C.), e.g., plasticizers, and polymeric auxiliaries. Of this total amount, normally

| i | from 3 to 90% by weight, preferably from 10 to 60% by weight, are accounted for by solid binder constituents (hydrogenated polymer P') |
|---|---|
| ii | from 5 to 85% by weight, preferably from 10 to 60% by weight, by at least one inorganic pigment, |
| iii | from 0 to 85% by weight, preferably from 20 to 70% by weight, by organic or inorganic fillers, and |
| iv | from 0.1 to 40% by weight, preferably from 0.5 to 15% by weight, by customary auxiliaries. |

The pigment volume concentration, pvc, of the coating compositions of the invention is generally above 10%, e.g., from 15 to 85%. The advantages of the hydrogenated polymers of the invention are manifested in partiular at a pvc$\geq$40, for example, at a pvc in the range from 40 to 80. The pvc is normally defined as the ratio, multiplied by 100, of the total volume of solid inorganic constituents (pigment+fillers) divided by the total volume of solid inorganic constituents and the polymer particles of the aqueous binder polymer dispersion; see Ullmann's Enzyklopädie der technischen Chemie, $4^{th}$ edition, Volume 15, p. 668.

Typical pigments ii for the formulations of the invention, especially for emulsion paints, are, for example, titanium dioxide, preferably in the rutile form, barium sulfate, zinc oxide, zinc sulfide, basic lead carbonate, antimony trioxide, lithopones (zinc sulfide+barium sulfate). The formulations may also, however, include colored pigments, examples being iron oxides, carbon black, graphite, luminescent pigments, zinc yellow, zinc green, ultramarine, manganese black, antimony black, manganese violet, Paris blue or Schweinfurt green. In addition to the inorganic pigments, the formulations of the invention may also contain organic color pigments, examples being sepia, gamboge, Cassel brown, toluidine red, para red, Hansa yellow, indigo, azo dyes, anthraquinonoid and indigoid dyes, and also dioxazine, quinacridone, phthalocyanine, isoindolinone and metal complex pigments.

Suitable fillers iii basically comprise alumosilicates, such as feldspars, silicates, such as kaolin, talc, mica, magnesite, alkaline earth metal carbonates, such as calcium carbonate in the form, for example, of calcite or chalk, magnesium carbonate, dolomite, alkaline earth metal sulfates, such as calcium sulfate, and silica, etc. The fillers can be used as individual components. In the art, however, mixtures of fillers have proved particularly suitable, examples being calcium carbonate/kaolin and calcium carbonate/talc.

The customary auxilaries iv include wetting agents or dispersants, such as sodium, potassium or ammonium polyphosphates, alkali metal salts and ammonium salts of polyacrylic acids and of polymaleic acid, polyphosphonates, such as sodium 1-hydroxyethane-1,1-diphosphonate, and also naphthalenesulfonic salts, especially the sodium salts. The dispersants are generally used in an amount of from 0.1 to 0.6% by weight based on the overall weight of the emulsion paint.

In addition, the auxiliaries iv may also include thickeners, examples being cellulose derivatives, such as methylcellulose, hydroxyethylcellulose and carboxymethylcellulose, and also casein, gum arabic, tragacanth gum, starch, sodium alginate, polyvinyl alcohol, polyvinylpyrrolidone, sodium polyacrylates, water-soluble copolymers based on acrylic and methacrylic acid, such as acrylic acid-acrylamide and methacrylic acid-acrylate copolymers, and what are known as associative thickeners, examples being styrene-maleic anhydride polymers or hydrophobically modified polyether urethanes, as are described, for example, by N. Chen et al. in J. Coatings Techn. Vol 69, No. 867, 1997, p. 73 and by R. D. Hester et al. in J. Coatings Technology, Vol. 69, No. 864, 1997, 109, and whose disclosure is hereby incorporated fully by reference into the present specification.

Inorganic thickeners as well, such as bentonites or hectorite, can be used. Thickeners are generally used in amounts of from 0.1 to 3% by weight, preferably from 0.1 to 1% by weight, based on the overall weight of the aqueous formulation. In addition, the auxiliaries iv generally also embrace defoamers, preservatives or hydrophobicizing agents, biocides, fibers, or further constituents.

In order to adjust the film-forming properties of the binder polymers the coating compositions may also include what are known as film-forming consolidating agents (plasticizers), examples being ethylene glycol, propylene glycol, butylene glycol, hexylene glycol, alkyl ethers and alkyl ether esters of glycols and polyglycols, such as diethylene glycol monoethyl ether, diethylene glycol monoethyl ether acetate, diethylene glycol monobutyl ether, hexylene glycol diacetate, propylene glycol monoethyl ether, monophenyl ether, monobutyl ether and monopropyl ether, dipropylene glycol monomethyl ether, dipropylene glycol mono-n-butyl ether, tripropylene glycol mono-n-butyl ether, and the acetates of the abovementioned monoalkyl ethers, e.g., butoxybutyl acetate, and also alkyl esters of aliphatic mono- and dicarboxylic acids, e.g., Texanol® from Eastman, or technical-grade mixtures of dibutyl esters of succinic acid, glutaric acid and adipic acid. Film-forming auxiliaries are normally used in amounts of from 0.1 to 20% by weight, based on the copolymer P present in the formulation, so that the formulation has a minimum film-forming temperature<15° C. and, preferably, in the range from 0 to 10° C.

Frequently, a distinction is made between solventborne and solvent-free emulsion paints. Solventborne emulsion paints usually contain less than 15% by weight of solvent and are used preferably for outdoor applications, whereas solvent-free paints are used preferentially in the interior sector. Typical solventborne paints contain as film-forming auxiliaries not only the abovementioned film-forming auxiliaries but also hydrocarbons and/or mixtures thereof, with or without aromatic components, such as white spirits with a boiling range from 140 to 210° C.

Furthermore, the formulations employed in accordance with the invention may also include crosslinking additives. Additives of this kind can be: aromatic ketones, e.g., alkyl phenyl ketones with or without one or more substituents on the phenyl ring, or benzophenone and substituted benzophenones as photoinitiators. Photoinitiators suitable for this purpose are disclosed, for example, in DE-A-38 27 975 and EP-A-417 568. Suitable compounds having a crosslinking action also include water-soluble compounds having at least two amino groups, examples being dihydrazides of aliphatic dicarboxylic acids in accordance with DE-A-39 01 073, if the polymer P contains carbonyl-containing monomers in copolymerized form.

The coating compositions of the invention are stable fluid systems which can be used to coat a large number of substrates. Accordingly, the present invention also provides a method of coating substrates. Examples of suitable substrates are wood, concrete, metal, glass, ceramics, plastic, plasters, wall coverings, and coated, primed or weathered substrates. Application of the formulation to the target substrate takes place in a manner dependent on the form of the formulation. Depending on the viscosity and pigment content of the formulation, and on the substrate, application may take place by rolling, brushing, knifecoating or spraying.

The coatings produced using the coating compositions of the invention are notable for high weathering stability in comparison to unhydrogenated dispersions of the polymers P, on exposure to ultraviolet radiation, for example.

A further advantageous field of use of the hydrogenated polymer dispersions of the invention is that of dispersion silicate paints and plasters. Dispersion silicate paints and plasters include the polymer dispersion and also potassium waterglass as further binder. The fraction of organic binder components in dispersion silicate paints can be up to 10% by weight, based on the overall weight of the paint, and in accordance with DIN 18363 will preferably not exceed approximately 5% by weight. The composition of a dispersion silicate paint is similar to that of an emulsion paint. Dispersion silicate paints and plasters further include as auxiliaries in many cases additives which improve the compatibility of dispersion and waterglass, and also hydrophobicizers. An exhaustive description of the various components and their effects on the properties is offered by the monograph "Dispersions-Silikatsysteme: Grundlagen-Formulierungen-Problemlösungen"[Dispersion Silicate Systems: Principles-Formulations-Solutions], Wolfgang Schultze et al, Expert-Verlag, Renningen-Malmsheim, 1995, which is hereby incorporated fully by reference into the present specification. It should be borne in mind here that preferably all of the components should be stable at the high pH brought about by the waterglass. Unlike the known binders based on styrene-butyl acrylate emulsion polymers, the hydrogenated polymers of the invention meet this requirement to a particular extent.

The dispersion silicate paints of the invention, in much the same way as conventional emulsion paints, are stable fluid systems which are applied conventionally to the target substrate, which is, for example, masonry, fiber cement panels, concrete walls, prefabricated concrete components such as prefabricated concrete walls, and comparable substrates. Thus applied, the dispersion silicate paints based on the hydrogenated polymers P' dry to extremely water-resistant coatings. In comparison to silicate emulsion paints based on unhydrogenated butadiene-styrene copolymers, these coatings possess enhanced resistance to liquid water, so that hydrophobicizers can be omitted. The high water vapor permeability typical of silicate paints, however, is unimpaired. A further point worth highlighting is the increased wet abrasion resistance of the coatings, which is thought to be based on enhanced adhesion and binding of the pigments and fillers.

The examples set out below are intended to illustrate the invention, though without restricting it.

Analysis

The glass transition temperature was determined by means of DSC (differential scanning calorimetry) evaluated by the midpoint method in accordance with ASTM D 3418-823.

The minimum film-forming temperature (MFT) of the polymer dispersions was determined in accordance with Ullmanns Enzyklopädie der technischen Chemie, $4^{th}$ edition, Vol. 19, VCH Weinheim 1980, p. 17. The measuring instrument used was a film former bench (a metal plate to which a temperature gradient is applied and on which temperature sensors are mounted at various points for temperature calibration, the temperature gradient being chosen such that one end of the film former bench has a temperature above the expected MFT and the other end has a temperature below the expected MFT). The aqueous polymer dispersion is applied to the film former bench. In those regions of the film former bench whose temperature is above the MFT a clear film is formed on drying, whereas in the cooler regions cracks appear in the film and at even lower temperatures a white powder is formed. The MFT is determined visually on the basis of the known temperature profile of the plate.

The hydrogenation conversion was determined from the ratio $I/I_o$ of standardized intensities of IR bands of hydrogenated samples (I) and unhydrogenated samples ($I_o$). The IR band at 960 $cm^{-1}$ results from the double bond of a 1,4-linked butadiene unit and the band at 910 $cm^{-1}$ from the double bond of a 1,2-linked butadiene unit. The intensities were standardized by integrating the respective band and comparing the resulting peak area against the peak area of the band at 699 $cm^{-1}$ (styrene unit).

The films for determining the water absorption were produced as follows: a weighed amount of the dispersions, diluted to a solids content of 25%, was poured into molds so that drying left films 0.5 mm thick. Dispersions having an MFT of less than 10° C. were filmed at 23° C., 50% relative humidity; at a higher MFT, the films were first dried at 50° C. for 2 d, then conditioned at 23° C. and 50% relative humidity for 24 hours. Squares whose sides measured 5 cm were punched from the films and placed in water for 24 hours, and the weight increase was recorded.

EXAMPLES

I. Starting Dispersions D1 to D4

Dispersion D1

A polymerization vessel was charged with 3800 g of water and a small amount of seed latex (polystyrene seed, 30 nm) and this initial charge was heated to 75° C. 6 g of sodium persulfate and 5% by weight of the monomer emulsion were added. Subsequently, while maintaining the temperature, 1900 g of a 6% strength by weight aqueous sodium persulfate solution and the remaining amount of the monomer emulsion were metered in over the course of 3.5 h, beginning at the same time and via separate feeds. Then polymerization was continued for one hour while maintaining the temperature. The amount of residual monomers was subsequently reduced to below ppm by means of combined chemical and physical deodorization.

The monomer emulsion consisted of 14,250 g of a monomer mixture of butadiene and styrene in a weight ratio of 1:1.85

-continued 440 g of acrylic acid
105 g of Texapon ® NSO (Henkel KGaA)
9300 g of water
1.19 g of ruthenium(III) tris-2,4-pentanedionate Dispersion D2
Preparation was as described for D1 except that the monomer emulsion contained additionally 60 g of tert-dodecylmercaptan.

Dispersion D3
Preparation was as described for D1 except that the monomer emulsion contained additionally 120 g of tert-dodecylmercaptan.

Dispersion D4
Preparation was as described for D1 but using a monomer mixture of butadiene and styrene in a weight ratio of 1:1.3.

II. Hydrogenated Dispersions HD1 to HD8

Hydrogenated Dispersion HD1
950 g of the aqueous polymer dispersion D1 were admixed with about 650 g of distilled and degassed water in order to establish a solids content of 30%. Then 0.07 g of tri-n-butylphosphine was added. This mixture was stirred at room temperature for 16 hours and then transferred to an autoclave which had been rendered inert a number of times beforehand. At room temperature, a pressure of 100 bar of hydrogen was injected first of all. Heating was carried out to 150° C.; as soon as this temperature was reached, the hydrogen pressure was increased to 280 bar and held constant over 15 hours. After the end of the reaction period, the autoclave was cooled, let down, and emptied. The degree of conversion was determined by IR spectroscopy.

Hydrogenated Dispersion HD2
The reaction was carried out as described for HD1 but the dispersion D1 was adjusted with distilled water to a solids content of 40%.

Hydrogenated Dispersion HD3
The reaction was carried out as described for HD1 but using dispersion D2.

Hydrogenated Dispersion HD4
The reaction was carried out as described for HD3 but the reaction time was 30 hours.

Hydrogenated Dispersion HD5
The reaction was carried out as described for HD1 but using dispersion D3.

Hydrogenated Dispersion HD6
The reaction was carried out as described for HD5 but the reaction time was 30 hours.

Hydrogenated Dispersion HD7
The reaction was carried out as described for HD1 but using dispersion D4.

Hydrogenated dispersion HD8
The reaction was carried out as described for HD7 but the reaction time was 30 hours.

| Dispersion | Initial dispersion | Hydrogenation conversion[1] [%] | MFT [° C.][2] | Tg [° C.][3] | Water absorption [%] |
|---|---|---|---|---|---|
| D1 | — | 0 | 28 | 28 | n.m.[4] |
| D2 | — | 0 | 28 | 27 | 2.1 |
| D3 | — | 0 | 30 | 22 | 1.5 |
| HD1 | D1 | >95 | 30 | 29 | 2.7 |

-continued

| Dispersion | Initial dispersion | Hydrogenation conversion[1] [%] | MFT [° C.][2] | Tg [° C.][3] | Water absorption [%] |
|---|---|---|---|---|---|
| HD2 | D1 | 95 | 24 | 29 | 1.9 |
| HD3 | D2 | 63 | 22 | 27 | 2.8 |
| HD4 | D2 | 90 | 25 | 26 | 2.5 |
| HD5 | D3 | 55 | 18 | 24 | 3.7 |
| HD6 | D3 | 69 | 20 | 23 | 3.5 |
| D4 | — | 0 | 6 | 11 | 10.4 |
| HD7 | D4 | 86 | 6 | 11 | 18.9 |
| HD8 | D4 | >95 | 1 | 13 | 4.7 |

[1]determined by means of IR spectrometry
[2]minimum film-forming temperature
[3]glass transition temperature
[4]n.m.: not measured III. Preparing the Aqueous Coating Compositions
a) Masonry Paints
The dispersions D1 to D4 and HD1 to HD8 were processed to masonry paints in accordance with the following formula (Comparative Examples C1 to C4, Examples 1 to 8).

The formula comprised the following constituents:

| | |
|---|---|
| 60.0 g | of water |
| 1.1 g | of dispersant[1] |
| 11.6 g | 10% strength by weight aqueous sodium polyphosphate solution[2] |
| 1.1 g | of conc. aqueous ammonia solution |
| 3.1 g | of commercial biocide[3] |
| 77.8 g | of 4% strength by weight aqueous thickener solution[4] |
| 39.0 g | of mica[5] |
| 130.8 g | of titanium dioxide pigment[6] |
| 25.0 g | of iron oxide pigment (yellow)[7] |
| 155.8 g | of calcite[8] |
| 39.0 g | of talc[9] |
| 3.8 g | of defoamer[10] |
| 6.6 g | of butyl diglycol |
| 13.2 g | of white spirit[11] and |
| alternatively: | |
| 389.0 g | of 50% by weight dispersion D1 to D4 and |
| 42.8 g | of water, or |
| 778.6 g | of 25% by weight dispersion HD1 to HD8 |

[1]30% by weight aqueous solution of an ammonium polyacrylate; Pigmentverteiler A from BASF AG, Ludwigshafen (DE)
[2]Calgon ® N from BK Ladenburg, Ladenburg (DE)
[3]Preservative KM 102 from Schultze & Mayr GmbH, Norderstedt (DE)
[4]Tylose MH 4000 K (4%) from Clariant GmbH, Wiesbaden (DE)
[5]Micro-Mica from Norwegian Talk AS Deutschland GmbH, Bad Soden (DE)
[6]Kronos ® 2056 from Kronos Titan GmbH, Leverkusen (DE)
[7]Bayterrox gelb 930 from Bayer AG, Leverkusen (DE)
[8]Microdol 1 from Norwegian Talk AS Deutschland GmbH, Bad Soden (DE)
[9]Talc A.T.1 from Norwegian Talk AS Deutschland GmbH, Bad Soden (DE)
[10]Nopco 8034 from Henkel KGaA, Düsseldorf (DE)
[11]White spirit K60 from Brenntag, Frankfurt (DE) (boiling range 180 to 210° C.)

The solids content of the paints was 59% by weight for the paints prepared with 50% by weight dispersion and 44% by weight for the paints prepared with 25% by weight dispersion. The binder/pigment ratio is identical for all paints.

The performance properties of the emulsion paints are summarized in Table 1.

b) Dispersion Silicate Paints
The dispersions D1, D3, Acronal 290 D and HD1 and HD6 were processed to dispersion silica paints in accordance with the following formula (CS1, CS2, CS3 and S1,

S2).

| |
|---|
| 217 g of water (or 117 g in the case of HD1 and HD6) |
| 2 g of thickener[12] |
| 2 g of dispersant[13] |
| 2 g of stabilizer[14] |
| 100 g of titanium dioxide pigment[15] |
| 2 g of defoamer[16] |
| 100 g of 50% by weight dispersion D1, D2, |
| 290 D[22] (or 200 g 25% by weight HD1, HD6) |
| 15 g of white spirit[11] |
| 100 g of calcite[17] |
| 40 g of talc[18] |
| 100 g of platelet filler 1[19] |
| 70 g of platelet filler 2[20] |
| 250 g of stabilized potassium waterglass, 29%[21] |

[12]Rhodopol 50 MD from Rhone Poulenc Chemie GmbH, Frankfurt (DE)
[13]Lopon 826 from BK Ladenburg GmbH, Ladenburg (DE)
[14]Betolin Quart from Woellner Werke, Ludwigshafen (DE)
[15]Kronos 2043 from Kronos Titan GmbH, Leverkusen, (DE)
[16]Agitan 280 from Münzing, Heilbronn (DE)
[17]Omyacarb BLP 3 from Omya GmbH, Cologne (DE)
[18]Talc A.T.1 from Norwegian Talk AS Deutschland GmbH, Bad Soden (DE)
[19]Plastorit 0000 from Luzenac Deutschland GmbH, Düsseldorf (DE)
[20]Plastorit 0 from Luzenac Deutschland GmbH, Düsseldorf (DE)
[21]Betolin P 35 from Woellner Werke, Ludwigshafen (DE)
[22]Acronal 290 D from BASF Aktiengesellschaft, Ludwigshafen (DE): aqueous copolymer dispersion based on styrene-butyl acrylate having an MFT of 20° C.
[20]Plastorit 0 from Luzenac Deutschland GmbH, Düsseldorf (DE)
[21]Betolin P 35 from Woellner Werke, Ludwigshafen (DE)
[22]Acronal 290 D from BASF Aktiengesellschaft, Ludwigshafen (DE): aqueous copolymer dispersion based on styrene-butyl acrylate having an MFT of 20° C.

The solids content of the paints was 53%.

The performance properties of the dispersion silicate paints are summarized in Table 2.

IV. Determining the Performance Properties

1. Weathering Stability (Chalking):

To determine the weathering stability of the coats of paint, two fiber cement panels (5×15 cm) each were first primed with a mixture of the emulsion paints prepared under IIIa and water in a weight ratio of 1:1 and then coated again with the emulsion paints from III. The amount of paint applied was 300 g/m² (dry application). One plate in each case was then exposed to artificial weathering, with the other plate serving as reference. After 100 hours, the chalking was determined in accordance with DIN 53159.

TABLE 1

Masonry paints

| Example | Dispersion | Chalking DIN 53159 |
|---|---|---|
| C1 | D1 | 4 |
| 1 | HD1 | 1 |
| 2 | HD2 | 0 |
| C2 | D2 | 4 |
| 3 | HD3 | 2 |
| 4 | HD4 | 0 |
| C3 | D3 | 4 |
| 5 | HD5 | 2 |
| 6 | HD6 | 1 |
| C4 | D4 | 4 |
| 7 | HD7 | 1 |
| 8 | HD8 | 0–1 |

2. Wet Abrasion Resistance

The dispersion silicate paints were tested for their abrasion resistance in accordance with DIN 53778 sheet 2: a coating bar with a width of 60 mm was used to draw down a coating film onto a glass plate. The depth of the gap was chosen so as to give a dry film thickness of 100 μm.

The film was dried under standard climatic conditions for 28 days. Then, in an abrasion instrument, an abrasion brush was guided over the coating with the continuous dropwise application of a 0.25% aqueous solution of sodium n-dodecylbenzenesulfonate. The number of back-and-forth strokes until the coating was abraded right through served as a measure of the wet abrasion resistance.

3. Capillary Water Absorption

The capillary water absorption of dispersion silicate paints was tested in accordance with DIN 52617 by way of the weight increase of coated lime sandstone slabs stored in water. For this purpose, lime sandstone slabs (to DIN 106, type: KS NF, apparent density: 2.0 kg/dm³, 240 mm×115 mm×71 mm) are coated on one of the large faces with the dispersion silicate paints. First of all, a primer consisting of the paint diluted 1:1 with water was applied. Then the paint was applied twice in undiluted form, so giving an overall application amount of 300 g/m². The side faces of the slabs were sealed with two-component coating material. The slabs were then dried for 28 d at 23° C., 50% relative humidity, then exposed to water three times for 24 hours, dried at 50° C. for 24 hours and finally conditioned for 7 d at 23° C. and 50% relative humidity. The slabs were first weighed, then stored in water to a depth of 1 cm with the coated face downward. After 24 hours, the slabs were removed and reweighed. The capillary water absorption is calculated from the difference in weight divided by the surface area under test and the root of the time.

TABLE 2

Dispersion silicate paints

| Example | Dispersion | Abrasion resistance/back-and-forth strokes | Capillary water absorption kg/m² × h^0.5 |
|---|---|---|---|
| CS1 | D1 | 5700 | 1.78 |
| CS2 | D3 | >6000 | 1.28 |
| S1 | HD1 | >6000 | 0.78 |
| S2 | HD6 | >6000 | 0.34 |
| CS3 | 290 D[1) | 2100 | 2.15 |

[1)]Acronal 290 D from BASF Aktiengesellschaft, Ludwigshafen (DE): aqueous copolymer dispersion based on styrene-butyl acrylate having an MFT of 20° C.

We claim:

1. A process for hydrogenating ethylenically unsaturated double bonds in polymers P by reacting an aqueous dispersion of at least one polymer P with hydrogen in the presence of at least one hydrogenation catalyst comprising ruthenium and at least one nonionic phosphorus compound capable of forming a coordinative compound with the ruthenium, which comprises incorporating the hydrogenation catalyst into the aqueous dispersion of the polymer P without adding a solvent.

2. A process as claimed in claim 1, wherein the hydrogenation catalyst is produced by adding at least one phosphorus compound to an aqueous dispersion of the polymer P containing the ruthenium in the form of a salt or a complex compound.

3. A process as claimed in claim 1, wherein the aqueous dispersion of the polymers P contains not more than 1000 ppm of an organic solvent.

4. A process as claimed in claim 1, wherein the phosphorus compound is selected from the group consisting of compounds of the formula I $$PR_3 \quad (I)$$

and compounds of the formula II $$R_2P-(O)_x-A-(O)_y-PR_2 \quad (II)$$

where

R radicals can be identical or different and independently of one another are $C_1$–$C_{10}$-alkyl, $C_4$–$C_{12}$-cycloalkyl, aryl, $C_1$–$C_{10}$-alkyloxy, $C_4$–$C_{12}$-cycloalkyloxy and aryloxy or fluoro, or two radicals R together are $C_3$–$C_6$-alkylene, $C_3$–$C_6$-alkenylene or $C_3$–$C_6$-alkadienylene, A is a bivalent hydrocarbon radical, and x,y independently of one another are 0 or 1.

5. A process as claimed in claim 1, wherein the aqueous dispersion of the polymers P has been prepared by free-radical aqueous emulsion polymerization of ethylenically unsaturated monomers M.

6. A process as claimed in claim 5, wherein the ruthenium in the form of a complex compound or a salt is dissolved or dispersed in the monomers M to be polymerized.

7. A process as claimed in claim 1, wherein from 1 to 1000 ppm of ruthenium are used based on the overall weight of the polymer P in the dispersion.

8. A process as claimed in claim 1, wherein the reaction is conducted at temperatures in the range from 20 to 250° C. and under hydrogen partial pressures in the range from 0.5 to 600 bar.

9. A process as claimed in claim 1, wherein the hydrogenation is carried out to a conversion of at least 50 mol %, based on the ethylenically unsaturated double bonds present in the polymer P.

10. A process as claimed in claim 1, wherein the polymers P comprise at least one conjugated diene as monomer a and at least one monoethylenically unsaturated monomer b which is copolymerizable with the diene, and, optionally, one or more modifying monomers c.

11. An aqueous polymer dispersion obtained by a process as claimed in claim 1, comprising at least one hydrogenated polymer P' derived from a polymer P.

12. An aqueous polymer dispersion as claimed in claim 11, wherein the polymer P comprises:

from 10 to 90% by weight of at least one monomer a selected from the group consisting of butadiene and isoprene, from 10 to 90% by weight of at least one monomer b selected from the group consisting of vinylaromatic monomers, esters of acrylic acid with a $C_1$–$C_{12}$-alkanol, esters of methacrylic acid with a $C_1$–$C_{12}$-alkanol, acrylonitrile and methacrylonitrile, from 0 to 20% by weight of one or more monomers c, the fractions of the monomers a, b and c adding up to 100% by weight and the fraction of acrylonitrile and methacrylonitrile being less than 20% by weight.

13. An aqueous coating composition comprising at least one aqueous polymer dispersion as claimed in claim 11 and at least one inorganic pigment and/or an organic filler.

14. A coating composition as claimed in claim 13 whose pigment volume concentration pvc is at least 40.

15. A coating composition as claimed in claim 13 in the form of a dispersion silicate paint.

* * * * *